O. SUMMERS.
PARACHUTE PACK AND HARNESS.
APPLICATION FILED MAR. 14, 1921.
1,386,971.
Patented Aug. 9, 1921.
3 SHEETS—SHEET 1.
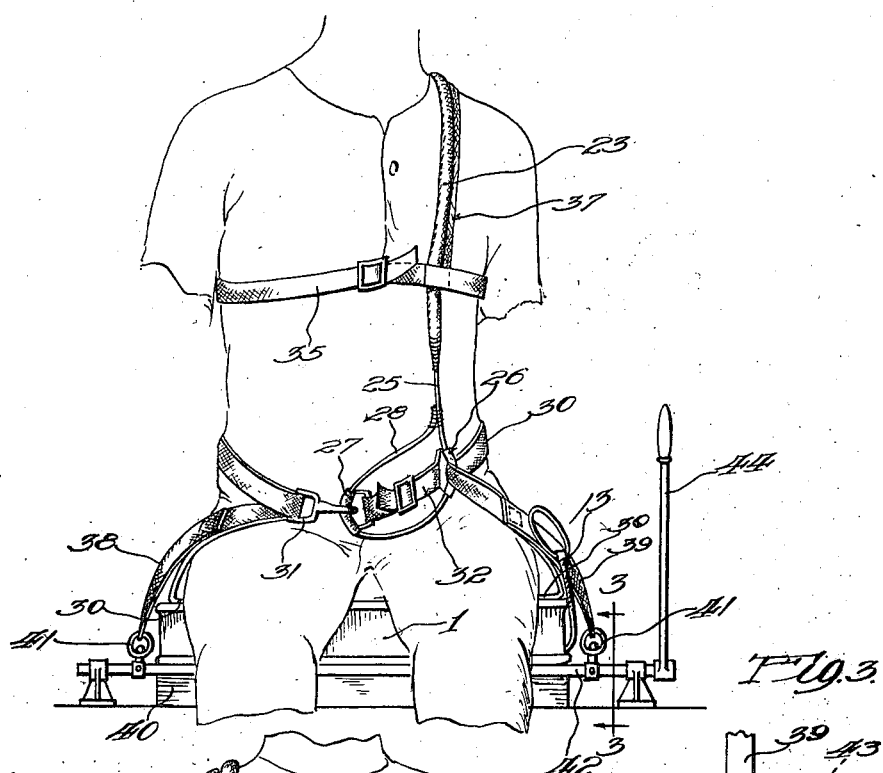
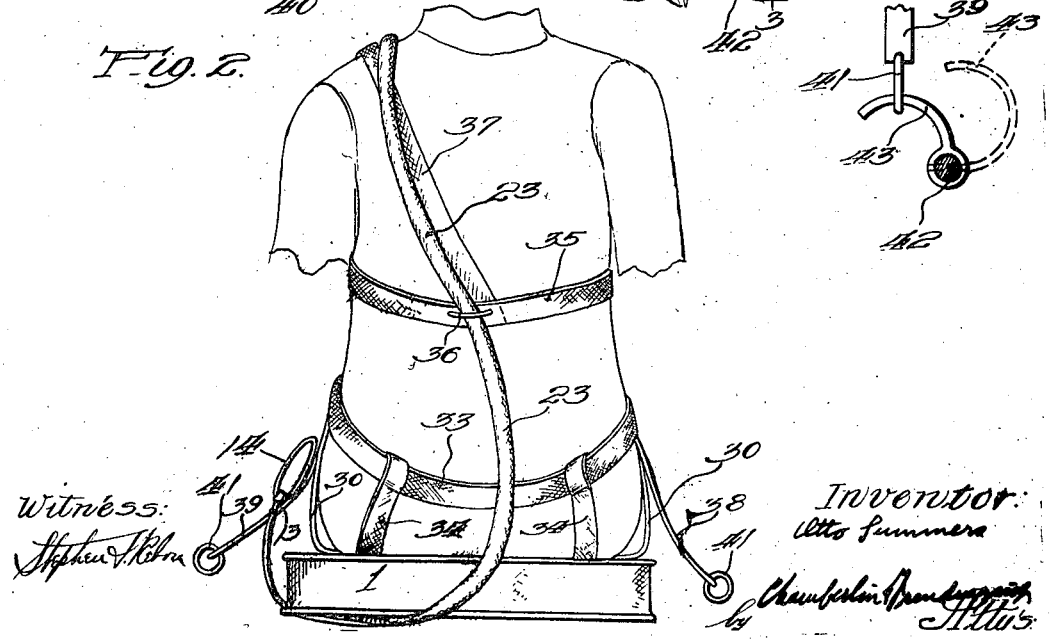

O. SUMMERS.
PARACHUTE PACK AND HARNESS.
APPLICATION FILED MAR. 14, 1921.
1,386,971.
Patented Aug. 9, 1921.
3 SHEETS—SHEET 2.
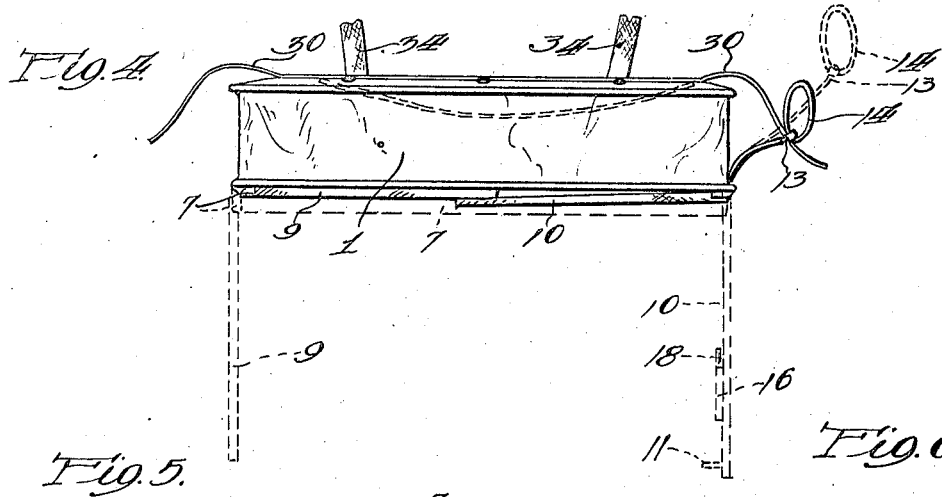
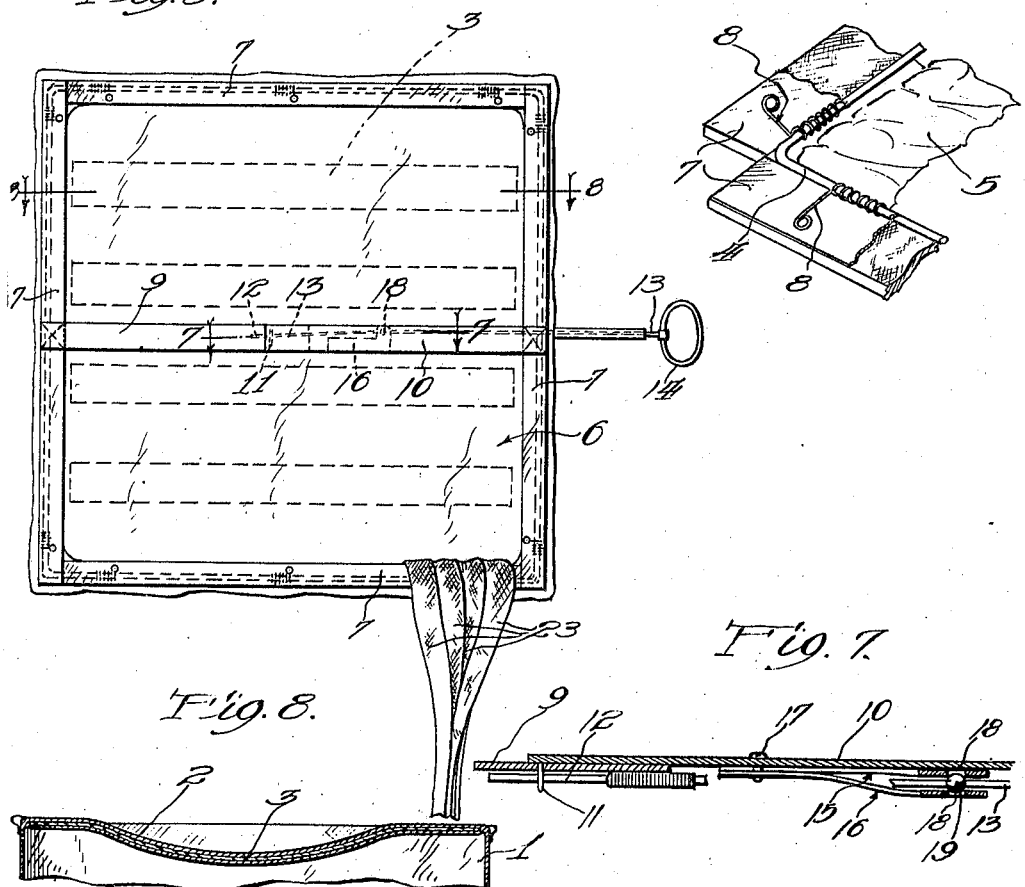
Witness:
Inventor:
Otto Summers O. SUMMERS.
PARACHUTE PACK AND HARNESS.
APPLICATION FILED MAR. 14, 1921.
1,386,971.
Patented Aug. 9, 1921.
3 SHEETS—SHEET 3.
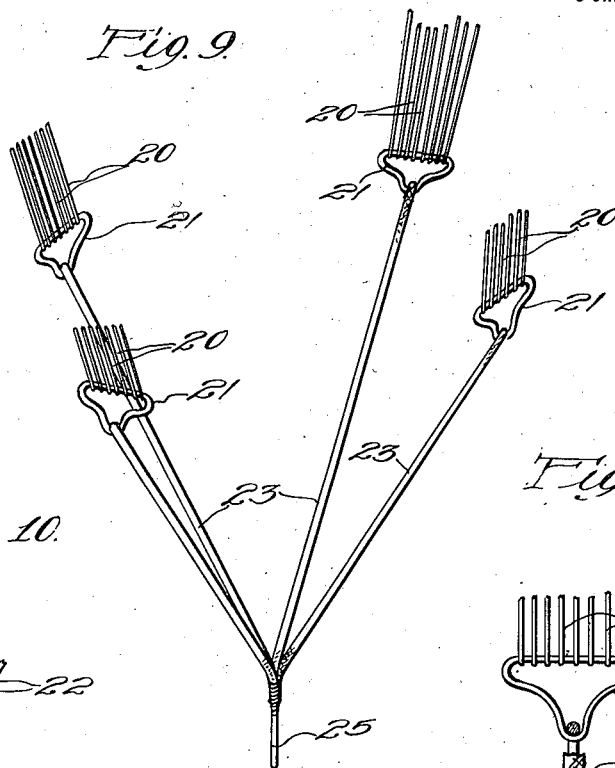
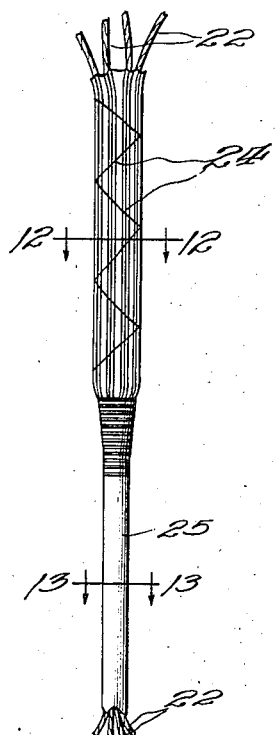
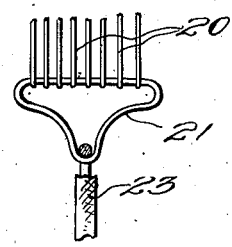
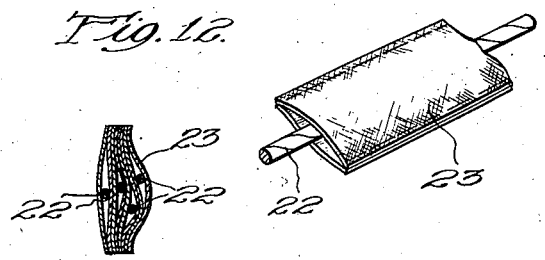
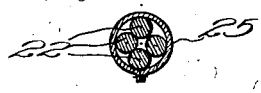

UNITED STATES PATENT OFFICE.

OTTO SUMMERS, OF CHICAGO, ILLINOIS, ASSIGNOR TO FLOYD SMITH AERIAL EQUIPMENT COMPANY, A CORPORATION OF ILLINOIS.

PARACHUTE PACK AND HARNESS.

1,386,971.  Specification of Letters Patent.  Patented Aug. 9, 1921.

Application filed March 14, 1921. Serial No. 451,957.

*To all whom it may concern:*

Be it known that I, OTTO SUMMERS, a citizen of the United States, residing at Chicago, county of Cook, State of Illinois, have invented a certain new and useful Improvement in Parachute Packs and Harness, and declare the following to be a full, clear, and exact description of the same, such as will enable others skilled in the art to which it pertains to make and use the same, reference being had to the accompanying drawings, which form a part of this specification.

My invention has for its object to produce a simple and novel parachute pack which will serve as a cushion on which the wearer sits when riding in an air vehicle.

A further object of the present invention is to produce a simple and novel parachute pack which will open positively, when released, and eject the parachute therefrom.

A further object of the present invention is to produce a simple and novel releasing device for a parachute pack, adapted to be actuated by a pull cord.

A further object of the present invention is to produce a simple and novel form of harness for attaching a parachute pack to a wearer, which shall be light in weight, which shall consist of a minimum number of elements so as to permit the wearer to move his body freely and which, when a jump is made, will automatically tighten itself without, however, producing any discomfort to the wearer or restricting the freedom of movement of the wearer.

A further object of the present invention is to produce a simple and novel harness for attaching a parachute pack to the person of a wearer, which shall serve as a life belt to hold the wearer from falling out of an airship.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of an aviator wearing one of my improved life packs and harness, seated in a normal position for making a flight, a fragment of the structure of the ship being also shown;

Fig. 2 is a rear elevation of the aviator, pack and harness in the position which these occupy in Fig. 1;

Fig. 3 is a section on an enlarged scale taken approximately on line 3—3 of Fig. 1, showing only a fragment of the life strap and the device for detachably fastening it to the ship;

Fig. 4 is a front elevation of the pack in its closed condition, only fragments of the harness being shown, showing also in dotted lines the position which the releasing cord takes when it is pulled to open the pack, and showing also in dotted lines the two parts of the lock for holding the pack closed swung into their release positions;

Fig. 5 is a bottom plan view of the closed pack;

Fig. 6 is a bottom plan view of one corner of the pack after it has been opened;

Fig. 7 is a section on an enlarged scale taken approximately on line 7—7 of Fig. 5, showing only the lock for the pack;

Fig. 8 is a section taken approximately on line 8—8 showing the top of the pack when the pack is open;

Fig. 9 is a perspective view of the suspending cables, together with the lower ends of the shroud lines to which they are connected, the parts being shown in the positions assumed when the parachute is open;

Fig. 10 is a side elevation on an enlarged scale of a fragment of the suspending cables bundled together as they normally are before the parachute is opened;

Fig. 11 is a detail of the connection between one of the supporting cables and the shroud lines;

Fig. 12 is a section taken approximately on line 12—12 of Fig. 10, on an enlarged scale;

Fig. 13 is a section taken approximately on line 13—13 of Fig. 10, on an enlarged scale; and Fig. 14 is a perspective view of a fragment of one of the cables with its inclosing envelop.

Referring to the drawing, 1 represents a shallow box or container, preferably approximately square and open on one of the broad sides which I shall refer to as the bottom. The member 1 may conveniently be made of fabric. In the top wall, 2, of the box or container are a series of flat leaf springs, 3, made bow shaped so that when free to do so the middle portions thereof project well into the interior of the container as shown in Fig. 8. When the parachute is packed into the container, the springs are flattened; but, being under tension, serve to eject the parachute positively from the container so as to insure that the parachute will be caught by the air currents and opened. Where the container is made out of fabric, definite shape may be given to the mouth thereof by means of a frame to which the free edges of the side walls are attached, this frame being conveniently made of wire as indicated at 4 in Fig. 6. After the parachute, 5, has been packed into the container, a detachable cover, 6, is laid upon the same, the cover being of some comparatively stiff material and substantially closing the open side of the container. Four narrow wings or flaps, 7, are hinged to the free edges of the side walls of the container, these members being comparatively stiff and rigid, and suitable springs, 8, being provided for the purpose of throwing them outwardly when free to do so. After the cover has been laid on the parachute the flaps or wings are folded inwardly so as to overlap the marginal portions thereof. Two opposed wings or flaps are first folded inwardly and are thereafter held in place by the other two which overlap them at the four corners of the container. At the middle of each of the two latter flaps or wings are arms, indicated respectively at 9 and 10, projecting at right angles to the flaps or wings and so positioned and of such lengths that when the flaps or wings are folded inwardly the members 9 and 10 overlap each other at their meeting ends. By providing some easily releasable means for securing the arms 9 and 10 together, the parachute may be maintained in a pack as long as desired and, when the parachute is to be used for a descent, the fastening means between the members 9 and 10 may be quickly released, permitting the springs, 8, to swing the wings or flaps outwardly, freeing the cover for the container, and thus permitting the leaf springs, 3, in the top wall of the container to eject the parachute and cover.

In order to fasten the members 9 and 10 detachably together, the member 10 is provided with a staple, 11, near the free end thereof, this staple projecting through an opening in the member 9, as shown in Fig. 7, when the pack is completed and closed. A pin, 12, is inserted through the staple, preventing the withdrawal of the latter from the member 9 while the pin is in place. This pin is carried on the end of a small rod or wire, 13, which extends along the inner side of the member 10 underneath the flap or wing, 7, by which the member 10 is carried, and outwardly some distance where it terminates in a ring, 14, which may be grasped by a person desiring to open the pack. Normally the pin is held against accidental engagement from the staple by means of a simple spring catch made up of two resilient leaves, 15 and 16, overlying each other on the inner side of the member 10 and riveted or otherwise secured to said member at one end as indicated at 17; the members 15 and 16 having near their free ends registering openings, 18. The rod or wire, 13, has thereon a ball or bulbous portion, 19, which may be forced between the free ends of the members 15 and 16 by exerting a light lateral pressure thereon and, when it comes opposite the holes 18, it enters these holes, permitting the members 15 and 16 to close upon the same and hold it yieldingly against accidental displacement. The ball is so located as to permit it to be brought into operative relation to the catch when the pin is in locking engagement with the staple.

The shroud lines, 20, of the parachute as shown in Fig. 9, are arranged in a plurality of groups, there being four shown. The shroud lines of each group have their lower ends fastened to what is known as a D-ring indicated at 21. To each D-ring is connected a small cable, 22, these cables serving as the connecting means between the shroud lines and the harness to be worn by the person using the parachute. The cables are preferably covered with individual sheathings, 23, preferably of fabric and made considerably wider than the diameter of the cable. Each sheathing may conveniently be made of two strips of fabric laid flat on each other and stitched together at the edges as shown in Fig. 14. The shroud lines and the adjacent ends of the suspending cables are of course housed in the container and, because the sheathed cables are thin and flat, they may be carried out of the container around one edge of the cover and underneath the adjacent flap or wing, 7, as illustrated in Fig. 5. After emerging from the container, the several cables are laid side by side and secured into a bundle as best illustrated in Fig. 10, by means of a comparatively weak cord or thread, 24, wrapped around the same. The sheathings, 23, are omitted from the extreme outer ends of the cables which are then brought together and housed within a single sheathing, 25, to form a single thick cable. This thick cable is passed through two guides, 26 and 27, as illustrated in Fig. 1 on the harness to be hereinafter described and is then brought back and fastened at its end to form a loop, 28. When the parachutist is descending, his weight is borne by this loop, being transmitted thereto through the guides 26 and 27. As soon as the parachute opens the weak cord or thread, 24, that holds the suspending cables in a bundle is broken so that the individually sheathed portions of the cable separate as shown in Fig. 9.

In using my improved pack it is made to serve as a seat cushion, the wearer sitting upon it. The container is attached directly to the harness so that it will not become lost when a jump is made.

The main member of the harness comprises an endless belt or strap, 30, which extends transversely across the top of the container and is secured thereto; the length of the strap or container being sufficient to permit a part thereof to extend around the back of the wearer and around toward the front from both sides about the waist or abdomen. The strap or belt passes around the guide 26 while slidable on the belt or strap at the other side of the wearer is a snap hook, 31, which may be hooked into engagement with the guide 27. The guides 26 and 27 are connected by an adjustable strap, 32, so that when the snap hook is engaged with the guide 27, the wearer is provided with a belt which completely encircles him and which will become tightened when his weight comes upon the supporting cable and causes the guides 26 and 27 to be drawn toward each other by the flattening loop, 28. The upper run, 33, of the belt or strap, which extends across the back of the wearer, may be connected to the top of the seat or to the lower run of the belt or strap by means of short straps, 34, making out of the belt or strap and the pack something in the nature of a basket in which the wearer sits. There is also preferably provided a suitable chest strap, 35, adapted to extend around the chest of the wearer, the same being attached to the suspending cables near the point where they are combined into a single cable. Furthermore, at the point where the suspending cables cross the chest strap at the back of the wearer, they may be fastened to the strap by means of threads, 36, or other means which will permit ready disengagement of the suspending cables from the strap at this point when the parachute is opened; the fastening means, 36, being simply a temporary expedient to prevent the suspending cables from being displaced and getting into the aviator's way at ordinary times. The chest strap may be supported by means of a shoulder strap, 37, fastened at one end to the back portion of the chest strap and at its other end to the front side of the chest strap.

Attached to the main harness member, 30, are a pair of short straps, 38 and 39, so positioned that when the wearer of the pack is seated thereon in the ship, the free ends of the straps 38 and 39 hang down into the vicinity of the stationary seat, 40, of the ship. By providing suitable detachable connections between the straps 38 and 39 and the stationary seat or frame, 40, of the ship, the harness is made to serve as a life belt which holds him in the ship and prevents him from accidentally falling out of the same.

In the arrangement shown, each of the straps 38 and 39 is provided at its free end with a ring, 41. Extending transversely in front of the seat, 40, is a rock shaft, 42, having thereon a pair of hooks, 43, so disposed that they may be engaged in the rings 41 when it is desired to fasten the aviator to the ship and be released from the rings by simply turning the rock shaft by means of the handle, 44, when it is desired to release the aviator.

I claim:

1. A container for a parachute having a detachable cover and a flexible wall opposite said cover, and a plurality of leaf springs arranged in and extending across said flexible wall, said springs being so shaped and so disposed that they constantly tend to press the middle portion of said wall inwardly into the container, thus causing said wall to push the contents of the container out of the latter when the cover is removed.

2. A container for a parachute in the form of a flat shallow box open on one of its large sides, stiff narrow wings or flaps hinged to the free edges of the walls bounding the open side of the box, springs tending to hold said flaps or wings turned outwardly, two opposed wings or flaps having parts adapted to overlap each other when said flaps are swung inwardly and being also constructed and arranged to overlie the ends of the remaining flaps to hold the latter flaps inwardly, a readily releasable fastening device between said overlapping parts, and a loose cover adapted to extend across said open side of the container and be overlapped at the margins by said flaps or wings when the latter are turned inwardly.

3. A container for a parachute in the form of a flat shallow rectangular box open on one of its large sides, stiff narrow wings or flaps hinged to the free edges of the walls bounding the open side of the box, springs tending to hold said wings or flaps turned outwardly, the ends of two of said flaps being adapted to overlie the ends of the other two when all of them are turned inwardly, so as to hold the latter against being swung outwardly by their springs, stiff tongues projecting from the middle portions of those two flaps which hold the remaining two flaps, said tongues being of such length that they overlap each other when the flaps are turned inwardly, a releasable fastening device between said tongues, and a detachable cover for said open side adapted to be overlapped at the margins by said flaps or wings when the latter are turned inwardly.

4. A container having a releasable closure, a locking pin for said closure, a pull member for said locking pin, said pull member having thereon an enlargement, and a spring-holding jaw arranged in position to receive said enlargement when the locking pin is in its locking position, the members of said jaw being normally spaced apart a distance less than the thickness of said enlargement and having registering seats therein adapted to receive and hold said enlargement.

5. The combination with a parachute pack, of a harness constructed and arranged to secure the pack to a wearer in position to permit the pack to serve as a seat, said harness having straps extending past opposite sides of the pack in position to extend downwardly when the pack is being used as a seat and to be fastened to a part of the airship to cause the harness to serve as a life belt to hold the wearer in the ship.

6. In combination, a parachute pack, a harness for securing the pack upon a wearer, said harness including seat and waist straps each of such a length that it extends only partway across the front of the wearer, the front ends of said straps being connected together, a parachute, and a suspending member connected to said parachute and coöperating with the front ends of said straps so as to tend to draw the ends of each of said straps together as the pull on the suspending member increases.

7. In combination, a parachute pack, a harness securing the pack to a wearer, said harness including a member partially surrounding the body of the wearer, guides on the free ends of said member, a parachute, a suspending member connected to said parachute, said suspending member having its lower end formed into a loop engaged with said guides so as to draw said guides toward each other when a pull is exerted upon said suspending member.

8. In combination, a parachute having shroud lines arranged in a plurality of groups, a small strong cable connected with each of said groups, the free ends of said cables being secured together to form a compound cable, a harness, and a connection between said compound cable and said harness.

9. In combination, a parachute having shroud lines arranged in a plurality of groups, a small strong cable connected with each of said groups, the free ends of said cables being secured together to form a compound cable, a harness, and a connection between said compound cable and said harness, the portions of said cables between the compound portion and the shroud lines having flat sheathings.

In testimony whereof, I sign this specification.

OTTO SUMMERS.